US007056869B2

(12) United States Patent
Guyomar et al.

(10) Patent No.: US 7,056,869 B2
(45) Date of Patent: *Jun. 6, 2006

(54) HYDROCARBON FLUIDS

(75) Inventors: Pierre-Yves Guyomar, Wezembeek-Oppem (BE); Olaf Peter Rudolf Keipert, Baldham (DE); Robert A. Verbelen, Brussels (BE); Gerd Merhof, Wuppertal (BE); Els H. Slachmuijlders, Londerzeel (BE); André A. Theyskens, Wemmel (BE)

(73) Assignee: ExxonMobil Chemical Patents Inc., Houston, TX (US)

(*) Notice: Subject to any disclaimer, the term of this patent is extended or adjusted under 35 U.S.C. 154(b) by 332 days.

This patent is subject to a terminal disclaimer.

(21) Appl. No.: 10/382,787

(22) Filed: Mar. 6, 2003

(65) Prior Publication Data

US 2003/0211949 A1 Nov. 13, 2003

(51) Int. Cl.
*C10M 105/02* (2006.01)
*C10M 111/04* (2006.01)
*C09D 11/02* (2006.01)
*C09D 183/04* (2006.01)

(52) U.S. Cl. .................. 508/110; 508/208; 585/20; 585/21; 585/22; 106/31.85; 106/31.88; 106/285; 507/100

(58) Field of Classification Search .............. 585/20, 585/21, 22; 508/208, 110
See application file for complete search history.

(56) References Cited

U.S. PATENT DOCUMENTS

| | | | |
|---|---|---|---|
| 2,165,951 A | 7/1939 | Winans | 260/110 |
| 3,364,134 A | 1/1968 | Hamblin | 208/93 |
| 3,411,369 A | 11/1968 | Hammann et al. | 74/200 |
| 3,502,572 A | 3/1970 | Stolfa | 208/108 |
| 3,595,776 A | 7/1971 | Davidson et al. | 208/14 |
| 3,714,021 A * | 1/1973 | Takahashi et al. | 208/14 |
| 3,730,876 A * | 5/1973 | Sequeira, Jr. | 208/59 |
| 3,753,188 A * | 8/1973 | Miyoshi et al. | 336/94 |
| 3,759,817 A | 9/1973 | Mills et al. | 208/14 |
| 4,028,224 A * | 6/1977 | MacDonald et al. | 208/92 |
| 4,036,734 A | 7/1977 | Manne et al. | 208/57 |
| 4,059,534 A * | 11/1977 | Morro et al. | 508/208 |
| 4,082,647 A | 4/1978 | Hutchings et al. | 208/78 |
| 4,264,458 A * | 4/1981 | Campbell et al. | 508/133 |
| 4,347,121 A | 8/1982 | Mayer et al. | 208/58 |
| 4,347,124 A | 8/1982 | Shimoiizaka et al. | 209/1 |
| 4,447,315 A | 5/1984 | Lamb et al. | 208/99 |
| 4,515,680 A * | 5/1985 | Hettinger et al. | 208/87 |
| 4,564,467 A * | 1/1986 | Rauline | 252/573 |
| 4,604,493 A * | 8/1986 | Shimizu et al. | 585/360 |
| 4,652,386 A * | 3/1987 | Alberts et al. | 508/208 |
| 4,719,022 A | 1/1988 | Hyde | 252/35 |
| 4,755,317 A * | 7/1988 | Minokami et al. | 252/73 |
| 4,795,840 A | 1/1989 | Torii et al. | 585/16 |
| 4,925,546 A | 5/1990 | Kukes et al. | 208/111 |
| 4,963,247 A | 10/1990 | Belinko et al. | 208/112 |
| 5,013,422 A | 5/1991 | Absil et al. | 208/27 |
| 5,015,360 A | 5/1991 | Degnan et al. | 208/110 |
| 5,043,497 A * | 8/1991 | Muraki et al. | 585/20 |
| 5,333,698 A | 8/1994 | Van Slyke | 175/65 |
| 5,372,703 A * | 12/1994 | Kamiya et al. | 208/58 |
| 5,558,766 A | 9/1996 | Prada et al. | 208/59 |
| 5,635,457 A * | 6/1997 | Van Slyke | 507/103 |
| 5,755,955 A | 5/1998 | Benham et al. | 208/112 |
| 5,863,976 A * | 1/1999 | Schneider | 524/476 |
| 6,028,038 A * | 2/2000 | Kusch | 508/304 |
| 6,149,720 A * | 11/2000 | Asada et al. | 106/31.26 |
| 6,156,109 A * | 12/2000 | Asada | 106/31.26 |
| 6,165,258 A * | 12/2000 | Asada | 106/31.26 |
| 6,322,692 B1 * | 11/2001 | Cody et al. | 208/18 |
| 6,326,338 B1 | 12/2001 | Garrett | 508/589 |
| 6,410,488 B1 * | 6/2002 | Fefer et al. | 507/103 |
| 6,491,809 B1 * | 12/2002 | Briot et al. | 208/18 |
| 6,514,403 B1 * | 2/2003 | Louie et al. | 208/58 |
| 6,547,956 B1 * | 4/2003 | Mukherjee et al. | 208/58 |
| 6,569,313 B1 * | 5/2003 | Carroll et al. | 208/49 |
| 6,814,856 B1 * | 11/2004 | Aussillous et al. | 208/57 |

FOREIGN PATENT DOCUMENTS

| | | |
|---|---|---|
| EP | 0 842 974 B1 | 5/1998 |
| EP | 0885921 | 12/1998 |
| GB | 1 243 992 | 8/1971 |
| GB | 2135691 | 9/1984 |
| WO | WO 97/23582 | 7/1997 |
| WO | WO 99/47626 | 9/1999 |
| WO | WO 01/83640 | 11/2001 |

OTHER PUBLICATIONS

Zh. Obshch. Khim., vol. 16, 1946, pp. 117-122 XP002247028 (Russian Translation to follow).
Beilstein [Online] Beilstein Institut zur Foerderung der Chemischen Wissenchaften, Frankfurt am Main, DE; Database-Accession No. 3193911 (BRN), 2 pages, Feb. 15, 1990, XP002247029.
Database Registry [Online] Chemical Abstracts Service, Columbus, Ohio, US; Database-Accession No. 6305-52-8 (RN), 2 pages, 1957, XP002247030.
Database Registry [Online] Chemical Abstracts Service, Columbus, Ohio, US; Database-Accession No. 22236-67-5 (RN), 2 pages, 1957, XP002247031.

(Continued)

Primary Examiner—Ellen M. McAvoy
(74) Attorney, Agent, or Firm—Andrew B. Griffis

(57) ABSTRACT

Hydrocarbon fluids are provided which have ASTM D-86 boiling point ranges within 235° C. to 400° C. and a naphthenic content greater than 60%, the naphthenics containing polycyclic materials, the fluids preferably have an aromatic content below 2% and an aniline point below 100° C. The fluids are particularly useful solvents for printing inks, drilling fluids, metal working fluids and as silicone extenders.

8 Claims, No Drawings

OTHER PUBLICATIONS

U.S. Appl. No. 10/383,177, filed Mar. 6, 2003, entitled "A Process for the Production of Hydrocarbon Fluids", Inventors: Pierre-Yves Guyomar et al. (2002M013).
Russian Translation for Zh. Obshch. Khim., vol. 16, 1946, pp. 117-122 XP002247028 (foreign document previously submitted) entitled "Investigations in the Series of Decalin II. β-Methyl- and β-Ethyl-Decalins", P. Ya. Levina and S. G. Kulikov, Laboratory of Organic Chemistry of Acad. N. D. Zelinski Moscow Lenin Order State University, 8 pages.
"Petro Canada Lubricants Handbook for the Year 2000".
"Hydrocarbon Processing," Nov., 1996—pp. 124-126, 128.

* cited by examiner

HYDROCARBON FLUIDS

CROSS-REFERENCE TO RELATED APPLICATIONS

This application claims priority to European Patent Application No. 02251586.0, filed Mar. 6, 2002.

BACKGROUND OF THE INVENTION

The present invention relates to hydrocarbon fluids and their uses. Hydrocarbon fluids find widespread use as solvents such as in adhesives, cleaning fluids, solvents for decorative coatings and printing inks, light oils for use in applications such as metalworking and drilling fluids. The hydrocarbon fluids can also be used as extender oils in systems such as silicone sealants and as viscosity depressants in plasticised polyvinyl chloride formulations. Hydrocarbon fluids may also be used as solvents in a wide variety of other applications such as chemical reactions.

The chemical nature and composition of hydrocarbon fluids varies considerably according to the use to which the fluid is to be put. Important properties of hydrocarbon fluids are the distillation range generally determined by ASTM D-86 or the ASTM D-1160 vacuum distillation technique for heavier materials, flash point, density, Aniline Point as determined by ASTM D-611, aromatic content, viscosity, colour and refractive index. Fluids are can be classified as paraffinic such as the Norpar® materials marketed by ExxonMobil chemical Company, isoparaffinic such as the Isopar® materials marketed by ExxonMobil Chemical Company; dearomatised fluids such as the Exxsol® materials, marketed by ExxonMobil Chemical Company; naphthenic materials such as the Nappar® materials marketed by ExxonMobil Chemical Company; non-dearomatised materials such as the Varsol® materials marketed by ExxonMobil Chemical Company and the aromatic fluids such as the Solvesso® products marketed by ExxonMobil Chemical Company.

Unlike fuels fluids tend to have narrow boiling point ranges as indicated by a narrow range between Initial Boiling Point (IBP) and Final Boiling Point (FBP) according to ASTM D-86. The Initial Boiling Point and the Final Boiling Point will be chosen according to the use to which the fluid is to be put however, the use of the narrow cuts provides the benefit of a precise flash point which is important for safety reasons. The narrow cut also brings important fluid properties such as a better defined viscosity, improved viscosity stability and defined evaporation conditions for systems where drying is important, better defined surface tension, aniline point or solvency power.

These hydrocarbon fluids are derived from the refining of refinery streams in which the fluid having the desired properties is obtained by subjecting the most appropriate feed stream to fractionation and purification. The purification typically consists of hydrodesulphurisation and/or hydrogenation to reduce the sulphur content or, in some instances, eliminate the presence of sulphur and to reduce or eliminate aromatics and unsaturates. Traditionally the aliphatic hydrocarbon fluids are produced from virgin or hydro-skimmed refinery petroleum cuts which are deeply hydrodesulphurised and fractionated. If a dearomatised fluid is required the product that has been deeply hydrodesulphurised and fractionated may be hydrogenated to saturate any aromatics that are present. Hydrogenation can also occur prior to the final fractionation.

There is currently a trend towards the use of fluids with extremely low levels of aromatics, extremely low sulphur levels and with higher initial boiling points. These requirements are driven by environmental and/or safety considerations and/or specific end-uses. The existing processes in which a light gas oil or virgin gas oil is first hydrofined and, if required, hydrogenated are constrained to feeds with a maximum ASTM D-86 Final Boiling Point (FBP) of 320° C. Feeds with higher boiling points, which tend to have higher sulphur levels can render the life of the hydrogenation catalyst too short and the higher content of aromatics in these feeds also limits the material that can be hydrogenated in an economic manner. Generally the boiling range of hydrocarbon fluids is measured using the atmospheric boiling measurement technique ASTM D-86 or its equivalent. However, ASTM D-86 is typically used to measure boiling temperature up to around 370° C., more typically up to 360° C. If however the fluid contains a fraction boiling above 365° C. it may be more convenient to use the ASTM D-1160 technique which measures the distillation temperature using vacuum techniques. Although the fluids specifically discussed herein are stated to have ASTM D-86 boiling points the boiling range of a fluid having a final boiling point above 365° C. may be measured by ASTM D-1160.

Further requirements for hydrocarbon fluids are that they have good cold flow properties so that their freezing points are as low as possible. There is also a need for improved solvency power particularly when the fluids are used as solvents for printing inks where it is necessary that they readily dissolve the resins used in the ink formulations.

BRIEF SUMMARY OF THE INVENTION

The fluids of the present invention have a variety of uses in for example drilling fluids, industrial solvents, in printing inks and as metal working fluids. The fluids are however particularly useful as components in silicone sealant formulations where they act as extender oils. Hydrocarbon fluids have been proposed as extenders in silicone sealant formulations as is shown in U.S. Pat. No. 5,863,976 which uses predominately hydrocarbons and European Patent Application 885921-A which uses a fluid that is predominantly paraffinic. European Patent 842974-B uses fluids based on alkyl cyclohexanes. The hydrocarbon fluids are included in order to provide the formulation with the desired characteristics and also because they are cheaper than the non-reactive silicone oils which are used as the conventional extenders in silicone sealant formulations.

The compatibility of existing hydrocarbon fluids with silicones is however limited especially when the fluid has a high initial boiling point (greater than about 290° C.). The lack of compatibility leads to the partial exudation of the hydrocarbon fluid out of the cured silicone seal and results in an oily film on the surface of the seal. It is therefore necessary to either reduce the amount of hydrocarbon fluid that is used which has economic debits or to use a fluid with a lower initial boiling point which results in a more volatile system. This can lead to the hydrocarbons evaporating out of the silicone seal, this in turn can lead to shrinkage of the seal and this can result in the seal failing to meet the criteria of the standard EN ISO 10563. It is also important that the fluids are not washed out due to a damp environment and particularly an environment which may contain a surfactant for cleaning purposes.

There is therefore a need for a hydrocarbon fluid having a low freezing point as measured by ASTM D-2386, a high initial boiling point, good solvency power and a low aromatics content.

The present invention therefore provides hydrocarbon fluids having ASTM D-86 boiling point ranges within 235° C. to 400° C. and containing more than 60 wt % naphthenics and at least 20 wt % of polycyclic naphthenics.

It is preferred that the fluid contains more than 70 wt % naphthenics. It is also preferred that the fluid have an aniline point below 100° C. A yet further preferred embodiment is that the fluid have an aromatics content below 2 wt %, more preferably below 1 wt %.

In a further embodiment the invention provides the use of a hydrocarbon fluid having ASTM D-86 boiling point ranges within 235° C. to 400° C. and containing more than 60 wt % naphthenics and at least 20 wt % of polycyclic naphthenics as a silicone extender oil.

In a further embodiment the invention provides a silicone sealing composition comprising from 30 to 60 wt % of a silicone polymer and from 10 to 40 wt % of a hydrocarbon fluid having ASTM D-86 boiling point ranges within 235° C. to 400° C. and containing more than 60 wt % naphthenics wherein at least 20 wt % of the naphthenics are polycyclic materials.

An ASTM D-86 boiling point range of 300° C. to 370° C. is preferred for silicone extenders because it gives a good balance between compatibility and volatility particularly at higher addition levels.

In a further embodiment the invention provides the use of a hydrocarbon fluid having ASTM D-86 boiling point ranges within 235° C. to 400° C. and containing more than 60% naphthenics at least 20 wt % of the naphthenics being polycyclic materials as a solvent for a printing ink. If the boiling point range extends above 370° C. it may be preferred to use the ASTM D-1160 measurement technique.

In a further embodiment the invention provides an ink comprising a pigment and a resin and, as a solvent, a hydrocarbon fluid having ASTM D-86 boiling point ranges within 235° C. to 400° C. and containing more than 60 wt % naphthenics wherein at least 20 wt % of the naphthenics are polycyclic materials. If the boiling point range extends above 370° C. it may be preferred to use the ASTM D-1160 measurement technique.

As with the fluid itself it is preferred that the material used with the silicone sealant or in the inks contain more than 70 wt % naphthenics, has an aniline point below 100° C. and an aromatic content below 2 wt % more preferably below 1 wt %.

It is further preferred that the hydrocarbon fluids of the present invention have an ASTM D-86 boiling range no greater than 75° C., preferably no greater than 65° C., more preferably no greater than 50° C.

Naphthenics are cyclic saturated hydrocarbons and the method used for determination of naphthenic content of the hydrocarbon fluid is based on ASTM D-2786: "Standard test method for hydrocarbon types analysis of gas-oil saturates fractions by high ionising voltage mass spectrometry".

This method covers the determination by high ionising voltage mass spectrometry of seven saturated hydrocarbon types and one aromatic type in saturated petroleum fractions having average carbon numbers 16 through 32. The saturate types include alkanes (no rings), single ring naphthenes and five fused naphthene types with 2, 3, 4, 5 and 6 rings. The non-saturated type is monoaromatic.

The samples must be non-olefinic and must contain less than 5 volume % monoaromatics. This is mostly the case for product samples. For feedstock sample analysis when aromatics are usually higher than 5 volume %, the aromatics are separated and determined by Liquid Chromatography or by Solid Phase Extraction.

The normal paraffins are separated and determined by Gas Chromatography upstream of the mass spectrometer. It is preferred to have a normal paraffin content below 10 wt %. The relative amounts of alkanes (no ring), 1-ring, 2-ring, 3-ring, 4-ring, 5-ring and 6-ring naphthenics is determined by a summation of mass fragment groups most characteristic of each molecular type. Calculations are carried out by the use of inverted matrices that are specific for any average carbon number. The fluids of the present invention contain at least 20 wt %, preferably at least 30 wt % more preferably at least 45 wt % of 2-ring, 3-ring, 4-ring, 5-ring and 6-ring naphthenics. From the relative amount of alkanes, the amount of iso paraffins can be determined by deducting the amount of normal paraffins from the amount of total alkanes.

The aromatics content of the fluids is measured by ultra violet absorption.

DETAILED DESCRIPTION OF THE INVENTION

The fluids of the present invention may be obtained by the hydrocracking of refinery streams and fractionating the hydrocracked product to obtain a cut having the desired boiling characteristics and then hydrogenating the desired cut to saturate the aromatics. Hydrocracking is a process that is used in refineries to convert heavy crude oil cuts into lighter and upgraded material. In hydrocracking the heavy molecules are cracked on specific catalysts under high hydrogen partial vapour pressure. Hydrocracking is traditionally used on vacuum gas oil or vacuum distilled fractions from reduced crude oil which is the residue left after atmospheric distillation. Typically this material corresponds to crude cut points between 340° C. and 600° C. and boils in the range 200° C. to 650° C. as measured by ASTM D-1160. Descriptions of hydrocracking processes may be found in Hydrocarbon Processing of November 1996 pages 124 to 128. Traditionally hydrocracker units have been used to crack heavy crude oil cuts or vacuum distilled crude oil cuts to produce upgrade materials such as kerosene, automotive diesel fuel, lubricating oil base stock or steam cracker feed, however hydrocrackers have not been used to produce feeds for the production of hydrocarbon fluids. Examples of hydrocracking and its use may be found in U.S. Pat. No. 4,347,124, PCT Publication WO 99/47626 and U.S. Pat. No. 4,447,315, these documents are not however concerned with hydrocarbon fluids.

We have now found that if a vacuum gas oil stream is hydrocracked, fractionated and hydrogenated, the new fluids of the present invention having the desired properties can be obtained. We have also found that it is preferable that the hydrocracked material be fractionated before it is hydrogenated. A typical feed to hydrocracking to produce the fluids of the present invention has the following properties:

Specific Gravity: 0.86–0.94

D-1160 distillation: IBP 240° C.–370° C., FBP 380–610° C.

Aromatics from 40 to 65 (1) wt %: 1 ring from 13 to 27, 2 ring from 10 to 20, 3 ring from 7 to 11, 4 ring from 6 to 12, total Naphthenes from 16 to 27 (1) wt %: 1 ring from 2 to 4, 2 ring from 4 to 7, 3 ring from 4 to 6, 4 ring from 4 to 7, total Paraffins from 7 to 16 wt %
Iso Paraffins from 8 to 20 wt %
Sulphur from 1.75 to 3 wt %
(1) the sum of minima or maxima may not match the total minima or total maxima as the individual minima or maxima may not be reached at the same time.

The sulphur level (in wt % range) is measured by ASTM D-2622 using X-Ray Fluorescence.

The product of hydrocracking may then be fractionated and hydrogenated to produce the highly naphthenic fluids of the present invention.

The subsequent processing of hydrocracked vacuum gas oil cuts may include, hydrogenation to reduce the level of aromatics and fractionation to obtain a fluid of the desired composition and ASTM D-86 boiling characteristics. We prefer that, when both hydrogenation and fractionation are involved, fractionation takes place before hydrogenation. The fluids that according to the present invention have a boiling range from 235° C. to 400° C. as measured by ASTM D-86 or equivalent, ASTM D-1160 may be used if the Final Boiling Point is above 365° C. That is to say that both the Initial Boiling Point and the Final Boiling Point are within the range of 235° C. to 400° C. It is also preferred that the boiling range be no greater than 75° C. and preferably no more than 65° C., more preferably no more than 50° C.; the boiling range being the difference between the Final Boiling Point (or the Dry Point) and the Initial Boiling Point as measured by ASTM D-86. The preferred boiling range will depend upon the use to which the fluid is to be put however, preferred fluids have boiling points in the following ranges:
235° C. to 265° C.
260° C. to 290° C.
290° C. to 315° C.
300° C. to 360° C.

A fluid having the desired boiling range may be obtained by appropriate fractional distillation of the hydrocracked vacuum gas oil.

As well as yielding fluids having the desired properties the use of hydrocracked cuts for feedstocks to produce the aliphatic hydrocarbon fluids of the present invention has the following additional advantages. The feedstocks used to produce the aliphatic hydrocarbon fluids have lower sulphur content (1 to 15 ppm by weight as opposed to 100 to 2000 ppm by weight in conventional fluid manufacture). The feedstocks have a lower aromatic content (3 to 30 wt % as opposed to the 15 to 40 wt % in conventional fluid manufacture). The lower sulphur content can avoid or reduce the need to install deep hydrodesulphurisation units and also results in less deactivation of the hydrogenation catalyst when hydrogenation is used to produce dearomatised grades. The lower aromatic content also diminishes the hydrogenation severity required when producing dearomatised grades.

The non-dearomatised fluids also have a lower normal paraffin content (3 to 10 wt % as opposed to 15 to 20 wt % in conventional fluid manufacture) and a higher naphthenic content (45 to 75 wt % as opposed to 20 to 40 wt % in conventional fluid manufacture). These products have less odour, improved low temperature properties such as a lower freezing point and pour point and in some applications an improved solvency power. The dearomatised fluids also have a higher naphthenic content (70 to 85 wt % as opposed to 50 to 60 wt %) and have improved low temperature properties and improved solvency power.

The fluids of the present invention are particularly useful as solvents for printing inks where the high polycyclic naphthenic content results in improved solvency for the ink resins. The fluids are also useful in applications where they are subject to low temperatures, such as drilling fluids, since the low paraffinic content lowers their freezing temperature. The fluids are useful as extender oils or softeners in silicone sealant compositions. The fluids have the general benefit that their higher Initial Boiling Point means they are less volatile producing less undesirable volatile organic compounds and furthermore less fluid is lost due to evaporation.

Silicone sealants are organopolysiloxane based compositions hardenable at temperatures below 50° C. in the presence of water which may be derived from humid air. These compositions, known as RTV or silicone sealants, form an elastomer after hardening at room temperature. Silicone sealants are used as binders, moulding masses or waterproofing products and are widely used in the construction industry.

The silicone sealant compositions primarily consist of an α, ω dihydroxy polydiorganosiloxane, one or several reticulating agents containing more than two reactive groups per molecule, capable of reacting with water and silanol groups and generally containing an accelerator.

In order to modify the characteristics of hardenable silicone compositions for specific applications, non-reactive polysiloxanes, such as α, ω trimethyl polydimethylsiloxanes, thixotropy agents such as pyrogenic silica's, mineral charges, biocides, UV absorbers, pigments, etc may be incorporated. The non-reactive polysiloxanes are however expensive and there is a need for less expensive alternatives.

Aliphatic fluids have been used to modify silicone sealants. However, although the incorporation of these components allows characteristics such as transparency, paintability etc to be improved, the desirable higher boiling fluids have not had sufficient compatibility and have exuded out of the finished seal. The more compatible lower boiling aliphatic fluids have been lost due to evaporation which damages the seal and can release undesirable volatile material into the atmosphere.

An attempt has previously been made to use organic substances such as adipates, polybutenes, etc as plasticisers in silicone sealant compositions vulcanising at room temperature. Generally, the lack of compatibility of polysiloxanes with other raw materials does not allow hardenable compositions to be made containing a high quantity of organic plasticisers without losing transparency and/or without exudation taking place. When the organic products have a good compatibility with polysiloxanes, they generally have a low molecular weight and a high volatility that renders them unsuitable as permanent plasticisers.

Polysiloxane based compositions are products which may be stored in the absence of humidity and which harden in the presence of humidity to form an elastomer. They are used as moulding or waterproofing agents. The compositions contain polysiloxanes with silanol groups, a reticulating agent and a catalyst which accelerates hardening of the composition in the presence of humidity. The reticulating agent used may be acetoxysilanes, alcoxysilanes, aminosilanes, oxysilanes, amidosilanes, etc. The polysiloxanes with silanol groups used are preferably α, ω-dihydroxy polydimethylsiloxanes with a viscosity ranging between 1000 and 500000 mPas at 25° C. and α, ω trimethylpolydimethylsiloxanes with viscosities ranging between 50 and 10 000 mPas at 25° C.

These compositions can contain plasticisers and/or thixotropy agents and/or binding agents and/or mineral charges and/or pigments and/or solvents and/or antioxidant additives and be primarily used as waterproofing, encapsulating, moulding or coating materials. The charges used are preferably silicas, calcium carbonates, quartz and diatomaceous earth's.

The silicone compositions of the present invention are characterised by containing the fluids of the present invention as extenders. The fluids are preferably used in an amount of 5 to 50 parts of the overall mixture. The compositions thus obtained are characterised by good compatibility of the extender with the silicone and little loss of solvent due to evaporation. In addition the compositions have good stability during storage, they will rapidly cure and they have a good resistance to yellowing of the hardened product.

In a further embodiment the fluids of the present invention are used as new and improved solvents.

In accordance with one aspect of the present invention, there is provided a solvent-resin composition comprising a resin component dissolved in the fluid of the present invention. The fluid component is typically 5–95% by total volume of the composition.

In accordance with a more limited aspect of the invention, the fluid is present in the amount 40–95% by total volume of the composition.

In accordance with a still more limited aspect of the invention, the fluid is present in the amount 30%–80% by total volume of the composition.

The fluids of the present invention may be used in place of solvents currently used for inks, coatings and the like.

The fluids of the present invention may be used to dissolve resins such as:
a) acrylic-thermoplastic;
b) acrylic-thermosetting;
c) chlorinated rubber;
d) epoxy (either one or two part);
e) hydrocarbon (e.g., olefins, terpene resins, rosin esters, petroleum resins, coumarone-indene, styrene-butadiene, styrene, methyl-styrene, vinyl-toluene, polychloroprene, polyamide, polyvinyl chloride and isobutylene);
f) phenolic;
g) polyester and alkyd;
h) polyurethane;
i) silicone;
j) urea; and,
k) vinyl polymers and polyvinyl acetate as used in vinyl coatings.

It is to be appreciated that this list does not include all resin types. Other resin types are intended to be encompassed by the scope of the present invention.

The type of specific applications for which the solvents and solvent-resin blends of the present invention may be used are coatings, cleaning compositions and inks.

For coatings the mixture preferably has a high resin content, i.e., a resin content of 20%–60% by volume. For inks, the mixture preferably contains a lower concentration of the resin, i.e., 5%–30% by volume. In yet another embodiment, various pigments or additives may be added.

The formulations can be used as cleaning compositions for the removal of hydrocarbons or in the formulation of coatings or inks.

The fluids of the present invention may also be used in cleaning compositions such as for use in removing ink, more specifically in removing ink from printing machines.

In the offset industry it is very important that ink can be removed quickly and thoroughly from the printing surface without harming the metal or rubber components of the apparatus. Further there is a tendency to require that the cleaning compositions are environmentally friendly in that they contain no or hardly any aromatic volatile organic compounds and/or halogen containing compounds. A further trend is that the compositions fulfil strict safety regulations.

In order to fulfil the safety regulations, it is preferred that the compositions have a flash point of more than 62° C., more preferably a flash point of 100° C. or more. Such high flash points makes the fluids safe for transportation, storage and use.

The fluids of this invention are also useful as drilling fluids. In one embodiment, the invention relates to a drilling fluid having the fluid of this invention as a continuous oil phase. In another embodiment, this invention relates to a rate of penetration enhancer comprising a continuous aqueous phase having the fluid of this invention dispersed therein.

Drilling fluids used for offshore or on-shore applications need to exhibit acceptable biodegradability, human, eco-toxicity, eco-accumulation and lack of visual sheen credentials for them to be considered as candidate fluids for the manufacturer of drilling fluids. In addition, fluids used in drilling need to possess acceptable physical attributes. These generally include viscosity's of less than 4.0 cSt at 40° C., flash point of 100° C. or greater and, for cold weather applications, pour points of −40° C. or lower. These properties have typically been only attainable through the use of expensive synthetic fluids such as hydrogenated polyalpha olefins, as well as unsaturated internal olefins and linear alpha-olefins and esters. These properties are provided by some fluids of the present invention, the products having a boiling range in the range 235° C. to 300° C. (ASTM D-86) being preferred.

Drilling fluids may be classified as either water-based or oil-based, depending upon whether the continuous phase of the fluid is mainly oil or mainly water. At the same time water-based fluids may contain oil and oil-based fluids may contain water.

Water-based fluids conventionally include a hydratable clay, suspended in water with the aid of suitable surfactants, emulsifiers and other additives including salts, pH control agents and weighing agents such as barite. Water constitutes the continuous phase of the formulated fluid and is usually present in an amount of at least 50% of the entire composition; minor amounts of oil are sometimes added to enhance lubricity.

We have found that the fluids of the present invention are particularly useful in oil-based fluids having a hydrocarbon fluid as the continuous phase. These fluids typically include other components such as clays to alter the viscosity, and emulsifiers, gallants, weighting agents and other additives. Water may be present in greater or lesser amounts but will usually not be greater than 50% of the entire composition; if more than about 10% water is present, the fluid is often referred to as an invert emulsion, i.e. a water-in-oil emulsion. In invert emulsion fluids, the amount of water is typically up to about 40 wt % based on the drilling fluid, with the oil and the additives making up the remainder of the fluid.

One advantage of the use of the fluids of the present invention is that they possess low levels of normal paraffins and exhibit good biodegradability and low toxicity. Further they have low pour points compared to other products made from vacuum gas oil feeds. Their viscosity does not increase rapidly with decreasing temperature and therefore they disperse more rapidly in the cold water conditions found in deep sea environments and northern climates. Therefore drilling fluids based on the present invention typically do not need to be stored in heated areas, even in cold weather climates.

The fluids of the present invention may also be used as metal working fluids together with traditional additives, such as extreme pressure agents, antioxidants, biocides and emulsifiers if the lubricants are to be used as aqueous emulsions. The use of the fluids of the present invention results in a reduction of undesirable odours, less solvent loss due to undesirable evaporation. The fluids may also be used in lubricants that are operational at lower temperatures. The products of this invention may be used for aluminium rolling.

Typically preferred ASTM D-86 boiling ranges for the uses of the fluids are that printing ink solvents (sometimes known as distillates) have boiling ranges 235° C. to 265° C., 260° C. to 290° C. and 280° C. to 315° C. Fluids preferred for use as drilling fluids have boiling ranges of 235° C. to 265° C. and 260° C. to 290° C. Fluids preferred for metal working having boiling ranges of 235° C. to 365° C., 260° C. to 290° C., 280° C. to 315° C. and 300° C. to 360° C. Fluids preferred as extenders for silicone sealants having boiling ranges of 235° C. to 265° C., 260° C. to 290° C., 280° C. to 315° C. or 300° C. to 360° C. Fluids preferred as viscosity depressants for polyvinyl chloride plastisols have boiling ranges of 235° C. to 265° C., 260° C. to 290° C., 280° C. to 315° C. and 300° C. to 360° C.

EXAMPLES

A fluid of the present invention is illustrated by reference to the following Example 1.

Example 1

A vacuum gas oil stream having the following typical composition was hydrocracked, fractionated and then hydrogenated:

| ASTM D1160 Distillation | IBP 250° C. | FBP 575° C. |
|---|---|---|
| Specific Gravity | 0.92 | |
| Aromatics wt % | 1 ring | 19 |
| | 2 rings | 17 |
| | 3 rings | 10 |
| | 4 rings | 9 |
| | Total | 55 |
| Unidentified wt % | 4 | |
| Naphthenes wt % | 1 ring | 3 |
| | 2 rings | 5 |
| | 3 rings | 4 |
| | 4 rings | 4 |
| | Total | 16 |
| Paraffins wt % | 11 | |
| Iso Paraffins wt % | 14 | |
| Sulphur wt % (ASTM D2622) | 2.1 | (1) |

(1) the 2.1 wt % of sulphur is contained within the wt % given for the various chemical families;
IBP means Initial Boiling Point;
FBP means Final Boiling Point.

A typical hydrocracker containing two reactors R1 and R2 was used. The conditions in the two reactors were as follows:

| | R1 | R2 |
|---|---|---|
| Temp ° C. | 378 | 354 |
| Pressure kPa | 14800 | 14200 |
| LHSV, hr$^{-1}$ | 0.98 | 0.89 |
| TGR, Nm$^3$/v | 1588 | 1948 |

LHSV is Liquid Hourly Spare Velocity
TGR is Treat Gas Ratio
Nm$^3$/v is normal cubic meters of hydrogen gas per liter of liquid feed The hydrocracked product was fractionated in a classical fractionator into different cuts (lights, kerosene material cut, diesel material cut, bottoms). The diesel material cut which was used in this invention had the following typical properties:

| Distillation ASTM D86 ° C. | |
|---|---|
| IBP | 244 |
| 5% | 261 |
| 10% | 268 |
| 20% | 277 |
| 30% | 286 |
| 40% | 294 |
| 50% | 304 |
| 60% | 314 |
| 70% | 326 |
| 80% | 339 |
| 90% | 356 |
| 95% | 368 |
| FBP | 370 |
| Flash Point, ° C. (ASTM D-93) | 113 |
| Density, g/ml 15° C. (ASTM D-4052) | 0.8558 |
| Aniline Point, ° C. (ASTM D-611) | 75.3 |
| Viscosity, cSt 25° C. (ASTM D-445) | 7.63 |
| Viscosity, cSt 40° C. (ASTM D-445) | 4.98 |
| Sulphur MC, mg/l (ASTM D-4045) | 8 |
| Bromine Index, mg/100 g (ASTM D-2710) | 341 |
| Chemical Composition | |
| n-Paraffins, wt % | 7.2 |
| Iso-Paraffins, wt % | 17.6 |
| Aromatics, wt % | 18.4 |
| Naphthenes, wt % | 56.7 |
| 1-ring | 18.5 |
| 2-rings | 18 |
| 3-rings | 13.9 |
| 4-rings | 6.3 |
| Carbon number distribution wt % | |
| C13 | 11.1 |
| C14 | 10.7 |
| C15 | 11.5 |
| C16 | 10.8 |
| C17 | 9.9 |
| C18 | 9.3 |
| C19 | 8.1 |
| C20 | 6 |
| C21 | 7.8 |
| C22 | 5.3 |
| C23 | 4.2 |
| C24 | 2.9 |
| C25 | 1.6 |
| C26 | 0.6 |
| C27 | 0.2 |

The chemical composition is measured by the methods described previously, the aromatics being determined by liquid chromatography and the carbon number distribution by GC assuming that, for example, all products between the mid point between the nC13 and nC14 peaks and the nC14 and nC14 peaks are C14 material.

The hydrocracked diesel was fractionated to produce different cuts being 0 to 40 vol %, 40 vol % to 75 vol %, 40 vol % to 95 vol % and 50 vol % to 95 vol % of the hydrocracked diesel.

These cuts were then hydrogenated using the following conditions:

Temperature: 200° C.;
Pressure: 2700 kPa;
Liquid Hourly Space Velocity: 1 hr$^{-1}$;
Treat Gas Ratio: 200 normal cubic metre of hydrogen gas per litre of liquid feed.

The properties of the materials obtained are set out in Table 1.

TABLE 1

| | Hydrogenated Hydrocrackate Diesel 0–40% Volume cut HHD0–40 | Hydrogenated Hydrocrackate Diesel 40–75% Volume cut HHD40–75 | Hydrogenated Hydrocrackate Diesel 40–95% Volume cut HHD40–95 | Hydrogenated Hydrocrackate Diesel 50–95% Volume cut HHD50–95 |
|---|---|---|---|---|
| DISTILLATION RANGE ASTM D86 | | | | |
| IBP | 237 | 308 | 305 | 312 |
| 50% | 262 | 313 | 324 | 331 |
| FBP | 287 | 342 | 364 | 366 |
| Aniline Point ° C. ASTM D611 | 75.6 | 88.6 | 91.2 | 92.8 |
| Saybolt colour | | 30 | 18 | 16 |
| Density @ 15° C., g/ml ASTM D4052 | 0.8423 | 0.8468 | 0.8472 | 0.8476 |
| Viscosity | | | | |
| @ 25° C.-cSt ASTM D445 | 4.12 | 10.32 | 12.4 | 13.77 |
| @ 40° C.-cSt ASTM D445 | 2.96 | 0.52 | 7.65 | 8.38 |
| Flash Point-ASTM D93 | 100 | 154 | 154 | 162 |
| Refractive Index @ 20° C. | 1.46 | 1.4636 | 1.464 | 1.4642 |
| COLD PROPERTIES | | | | |
| Pour Point ° C. ASTM D97 | −40 | −12 | −6 | −3 |
| Freezing Point ° C. ASTM D2386 | not tested | not tested | +5 | +7.5 |
| Cloud Point ° C. ASTM D5772 | not tested | not tested | +2.5 | +5.5 |
| Wt % Aromatics by UV | 0.0042 | 0.184 | 0.19 | 0.2 |
| Composition, wt % | | | | |
| Normal Paraffins | 6 | 7.4 | 6.1 | 8.4 |
| ISO Paraffins | 15.1 | 20.9 | 23.2 | 23.4 |
| Total Aromatics | 0 | 0 | 0 | 0 |
| Total Naphthenics | 78.9 | 71.7 | 68.7 | 68.2 |
| 1-ring | 25.3 | 22.9 | 24.8 | 24.6 |
| 2-rings | 31.5 | 20.5 | 21.5 | 20.6 |
| 3-rings | 19.5 | 17.6 | 14.2 | 13.6 |
| 4-rings | 2.6 | 10.7 | 8.3 | 8.5 |
| 5-rings | 0 | 0 | 0 | 0.7 |
| 6 rings | 0 | 0 | 0 | 0 |
| Carbon No. distribution Capillary Column wt % | | | | |
| C13 | 13.8 | | | |
| C14 | 16.2 | | | |
| C15 | 26.8 | | | |
| C16 | 22.9 | 1.2 | 3.1 | 0.7 |
| C17 | 16.7 | 15.3 | 12.4 | 6.6 |
| C18 | 3.5 | 25.4 | 16.1 | 13.9 |
| C19 | 0.1 | 24.3 | 15.8 | 16.7 |
| C20 | | 17.7 | 13.7 | 15.7 |
| C21 | | 9.7 | 12.4 | 14.8 |
| C22 | | 4 | 10.7 | 12.6 |
| C23 | | 1.6 | 8.1 | 9.7 |

TABLE 1-continued

|  | Hydrogenated Hydrocrackate Diesel 0–40% Volume cut HHD0–40 | Hydrogenated Hydrocrackate Diesel 40–75% Volume cut HHD40–75 | Hydrogenated Hydrocrackate Diesel 40–95% Volume cut HHD40–95 | Hydrogenated Hydrocrackate Diesel 50–95% Volume cut HHD50–95 |
|---|---|---|---|---|
| C24 |  | 0.6 | 4.7 | 5.6 |
| C25 |  | 0.2 | 2.1 | 2.6 |
| C26 |  |  | 0.7 | 0.8 |
| C27 |  |  | 0.2 | 0.3 |

The HHD 0–40 is suitable for use as drilling fluid.

Example 2 illustrates the use of the fluids of the invention as silicone extenders for an acetoxy silicone sealant, sold by Bayer under the tradename Silopren, Rezeptur WWB 14057.

Example 2

The Hydrogenated Hydrocrackate Diesel used are the cuts described in Example 1. They will be referred to as HHD followed by the figures of the volume cut, thus HHD 40–75, HHD 40–95 and HHD 50–95 refer to the 40–75% cut, the 40–95% cut and the 50–95% cut respectively.

The compatibility of the products with the silicone sealant were evaluated in formulations containing 25–30–35–40 wt % of the extender. The evaluation is performed manually, using a polyethylene bag. First the silicone sealant is placed in the bag and then the extender is added; the two components are kneaded manually until a homogeneous mixture is obtained. A small tip of the polyethylene bag was then cut away and about 20 grams of the mixture was pushed out of the bag onto a polyethylene sheet. A second polyethylene sheet was then applied on top of the heap of the mixture. A glass plate is placed on top of the second sheet and a force is applied so the heap is pushed flat to a thickness of (2 mm). In this way a disk of the mixture of a diameter of 10 cm and thickness of 2 mm is obtained. This disk is then left between the two polyethylene sheets at room temperature for two days until vulcanisation of the sealant has taken place and the polyethylene sheets can be removed from the (hardened) disk.

The optical properties and the compatibility of the fluid with the sealant are then judged visually. The results are in Table 2.

TABLE 2

| | Disk aspects after 7 days @ Room Temperature | | |
|---|---|---|---|
| Extender addition | Transparency | Exudation | Colour |
| 25 wt % | | | |
| HHD 40–75 | NT | NT | NT |
| HHD 40–95 | NT | NT | NT |
| HHD 50–95 | clear | + | no |
| 30 wt % | | | |
| HHD 40–75 | clear + | no | no |
| HHD 40–95 | clear ++ | + | no |
| HHD 50–95 | clear | +++ | no |
| 35 wt % | | | |
| HHD 40–75 | clear ++ | + | no |
| HHD 40–95 | transparent | ++ | whitish |
| HHD 50–95 | non-transparent | +++ | white |

TABLE 2-continued

| | Disk aspects after 7 days @ Room Temperature | | |
|---|---|---|---|
| Extender addition | Transparency | Exudation | Colour |
| 40 wt % | | | |
| HHD 40–75 | clear +++ | + | no |
| HHD 40–95 | non-transparent | +++ | white |
| HHD 50–95 | NT | NT | NT |

NT = Not Tested
+ = some
++ = more
+++ = severe

Resistance to Ultra Violet Light

The resistance to ultra violet light of the disks obtained as set out above was measured as follows:

The disks are exposed to ultra violet light (using an ultra violet lamp) for a period of 8 weeks. In order to have a reference, the disk is divided in two equal portions. One half is exposed to ultra violet light, and the other half is covered with aluminium foil and a glass plate, blocking the ultra violet light. After 2, 4 and 8 weeks, the disks are inspected visually and the effect of the ultra violet light is compared to the non-exposed half.

The results are set out in Table 3.

TABLE 3

| | HHD 40–75 | HHD 40–95 | HHD 50–95 |
|---|---|---|---|
| Wt % Extender Original | 30 | 30 | 25 |
| Aspect after 7 days @ RT (Refer: Table 2) | clear + no exudation colourless | clear ++ exudation + colourless | clear exudation + colourless |
| After 2 weeks | | | |
| UV | slightly hazy colourless | slightly hazy colourless greasy touch | slightly hazy colourless |
| Non-UV | clear colourless | clear + colourless | clear colourless |
| After 4 weeks | | | |
| UV | slightly hazy colourless | slightly hazy colourless greasy touch | slightly hazy colourless |
| Non-UV | clear colourless | clear + colourless | clear colourless |

TABLE 3-continued

|  | HHD 40–75 | HHD 40–95 | HHD 50–95 |
|---|---|---|---|
| After 8 weeks | | | |
| UV | slightly hazy colourless | hazy colourless greasy touch | slightly hazy colourless |
| Non-UV | clear colourless | clear + colourless | clear colourless |

RT = Room Temperature

The weight and volume loss of the hardened sealant was also tested using ISO 10563:1991 test method entitled Building construction—Sealants for joints—Determination of change in mass and volume. In this test specimens consisting of metal rings filled with the sealant to be tested are submitted to room temperature and to elevated temperature. The differences between the mass and/or volumes of the test specimens before and after exposure to the temperatures is recorded.

Three metal rings (non-corrosive material, outer diameter: 34 mm, inner diameter: 10 mm, height: 10 mm, with a hook attached) are prepared for each property to be tested. Each unfilled ring is weighed in air (mass m1) for the volume test, also in a test liquid (mass m2). The test liquid consists of 300 ml demineralised water containing 2 ml liquid soap (wetting agent). The rings are then filled with the sealant to be tested, care being taken that no air bubbles are formed and that the sealant is pressed to the inner surface of the metal ring. The sealant should be trimmed so that it is flat with the upper ring of the metal rings. Each filled ring is then weighed in air (mass m3) and in the test liquid (mass m4).

After preparation and weighing the test specimens are suspended and stored under the following conditions:

a. 28 days at $(23\pm2)°$ C. and $(50\pm5)\%$ relative humidity.
b. 7 days at $(70\pm2)°$ C. in a ventilated oven.
c. 1 day at $(23\pm2)°$ C. and $(50\pm5)\%$ relative humidity.

The specimens are immediately weighed following the period of storage (mass m5) in air and (mass m6) in test liquid.

Steps a, b and c are performed sequentially so that only 1 series of rings is prepared.

Calculation and Expression of Results:

The percentage change in mass is calculated as follows:

Delta mass=$(m5-m3)/(m3-m1)*100$;

The percentage change in volume is calculated as follows:

Delta volume=$((m5-m6)-(m3-m4))/((m3-m4)-(m1-m2))*100$

The results are set out in Table 4.

TABLE 4

| 30 wt % | 7 days @ 70° C. | | 7 days @ RT and 7 days @ 70° C. | | 28 days @ RT and 7 days @ 70° C. and 1 day RT | |
|---|---|---|---|---|---|---|
| FLUID | Air | Water | Air | Water | Air | Water |
| HHD, 40–75, | | | | | | |
| % Mass change | -20.841 | | -20.775 | | -16.495 | |
|  | -20.434 | | -23.259 | | -15.922 | |
|  | -18.884 | | -19.471 | | -17.556 | |

TABLE 4-continued

| 30 wt % | 7 days @ 70° C. | | 7 days @ RT and 7 days @ 70° C. | | 28 days @ RT and 7 days @ 70° C. and 1 day RT | |
|---|---|---|---|---|---|---|
| FLUID | Air | Water | Air | Water | Air | Water |
| Average % Mass change | -20.05 | | -21.17 | | -16.66 | |
| % Volume change | | -22.894 | | -23.541 | | — |
|  | | -22.935 | | -25.456 | | 19.041 |
|  | | -20.477 | | -21.939 | | — |
| Average % Volume change | | -22.10 | | -23.65 | | 18.390 |
|  | | | | | | — |
|  | | | | | | 20.107 |
|  | | | | | | -19.18 |
| HHD, 40–95, | | | | | | |
| % Mass change | -12.298 | | -13.505 | | -13.653 | |
|  | -11.085 | | -12.901 | | -13.321 | |
|  | -10.180 | | -10.453 | | -14.367 | |
| Average % Mass change | -11.19 | | -12.29 | | -13.78 | |
| % Volume change | | -13.682 | | -15.276 | | — |
|  | | -12.414 | | -14.803 | | 15.808 |
|  | | -11.433 | | -12.092 | | — |
| Average % Volume change | | -12.51 | | -14.06 | | 15.582 |
|  | | | | | | — |
|  | | | | | | 16.789 |
|  | | | | | | -16.05 |
| HHD, 50–95, | | | | | | |
| % Mass change | -8.561 | | -9.470 | | -12.192 | |
|  | -9.534 | | -8.773 | | -12.092 | |
|  | -10.194 | | -9.531 | | -11.426 | |
| Average % Mass change | -9.43 | | -9.26 | | -11.90 | |
| % Volume change | | -9.882 | | -11.153 | | — |
|  | | -10.813 | | -10.328 | | 14.685 |
|  | | -11.376 | | -11.090 | | — |
| Average % Volume change | | -10.69 | | -10.86 | | 14.800 |
|  | | | | | | — |
|  | | | | | | 13.941 |
|  | | | | | | -14.48 |

RT = Room Temperature

The invention claimed is:

1. A silicone oil composition comprising a hydrocarbon fluid comprising more than 60 wt % naphthenics, and at least 20 wt % of polycyclic naphthenics, and a silicone oil, wherein said hydrocarbon fluid has ASTM D-86 boiling point ranges within 235° C. to 400° C.

2. The silicone oil composition according to claim 1, wherein said hydrocarbon fluid has ASTM D-86 boiling ranges within 300° C. to 370° C.

3. A silicone sealing composition comprising from 30 to 60 wt % of a silicone polymer and from 10 to 40 wt % of a hydrocarbon fluid having ASTM D-86 boiling point ranges within 235° C. to 400° C., comprising more than 60 wt % naphthenics wherein at least 20 wt % of said naphthenics are polycyclic materials.

4. A silicone sealing composition according to claim 3 wherein the hydrocarbon fluid has ASTM D-86 boiling ranges within 300° C. to 370° C.

5. An ink composition comprising a hydrocarbon fluid, having ASTM D-86 boiling point ranges within 235° C. to 400° C., the hydrocarbon fluid comprising more than 60% naphthenics, wherein at least 20 wt % of said naphthenics are polycyclic materials, and a pigment for a printing ink.

6. An ink comprising a pigment, a resin, and a hydrocarbon fluid having ASTM D-86 boiling point ranges within 235° C. to 400° C., the hydrocarbon fluid comprising more than 60 wt % naphthenics, wherein at least 20 wt % of naphthenics are polycyclic materials.

7. A drilling fluid comprising a hydrocarbon fluid comprising more than 60 wt % naphthenics, at least 20 wt% of polycyclic napthenics, and an oil-based continuous phase or a water-based continuous phase, wherein said hydrocarbon fluid has an ASTMD-86 boiling point range in the range 235° C. to 400° C.

8. A metal working fluid comprising more than 60 wt % naphthenics and at least 20 wt % of polycyclic naphthenics, wherein said hydrocarbon fluid has an ASTMD-86 boiling point range within 235° C. to 400° C. and an additive selected from extreme pressure agents, antioxidants, biocides and emulsifiers.

* * * * *